United States Patent [19]

Fowler

[11] Patent Number: 4,839,519

[45] Date of Patent: Jun. 13, 1989

[54] TEMPERATURE MEASURING

[76] Inventor: Peter H. Fowler, 320 Canford Lane, Westbury-on-Trym, Bristol BS3 3PL, England

[21] Appl. No.: 118,969

[22] Filed: Nov. 10, 1987

Related U.S. Application Data

[63] Continuation of Ser. No. 810,024, Dec. 17, 1985.

[30] Foreign Application Priority Data

Dec. 18, 1984 [GB] United Kingdom ............... 8431870

[51] Int. Cl.$^4$ .................................................. G01K 11/00
[52] U.S. Cl. ................................ 250/390.01; 374/159
[58] Field of Search ................... 250/392, 390; 374/159

[56] References Cited

U.S. PATENT DOCUMENTS 3,051,838  8/1962  Culp, Jr. ............................. 250/392

FOREIGN PATENT DOCUMENTS 1154653  9/1963  Fed. Rep. of Germany ... 250/390 R

OTHER PUBLICATIONS

Fowler et al., "Temp. Imaging Using Epithermal Neutrons", Rutherford Appleton Lab., Publication RAL-8-7-056 (Aug. 1987).

Harms et al., "Temperature Sensing by Neutron Transmission"; Nuclear Instruments and Methods 104 (1972) 217.

Haste and Sowerby, "A Study of the Temperature Dependence of the Neutron Transmission of Uranium Dioxide"; J. Phys. D: Appl. Phys., vol. 12, 1979, pp. 1203-1221.

Primary Examiner—Janice A. Howell
Assistant Examiner—Richard Hanig
Attorney, Agent, or Firm—Welsh & Katz, Ltd.

[57] ABSTRACT

A system for measuring the temperature of an item comprises means for supplying a beam of neutrons to expose the item to the beam; means for monitoring the transmission characteristics of the item to neutrons; and means for obtaining from the result of the monitoring an indication of the temperature of the item.

14 Claims, 15 Drawing Sheets

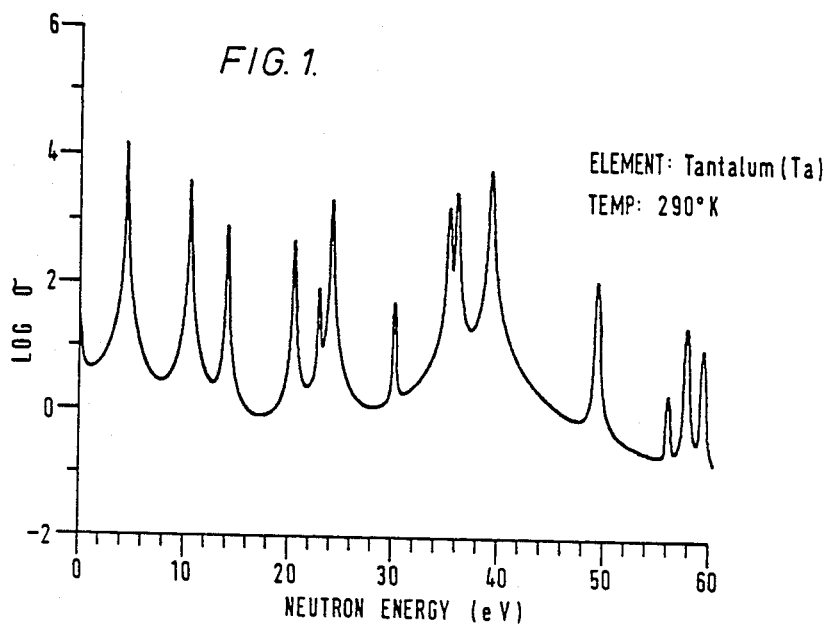
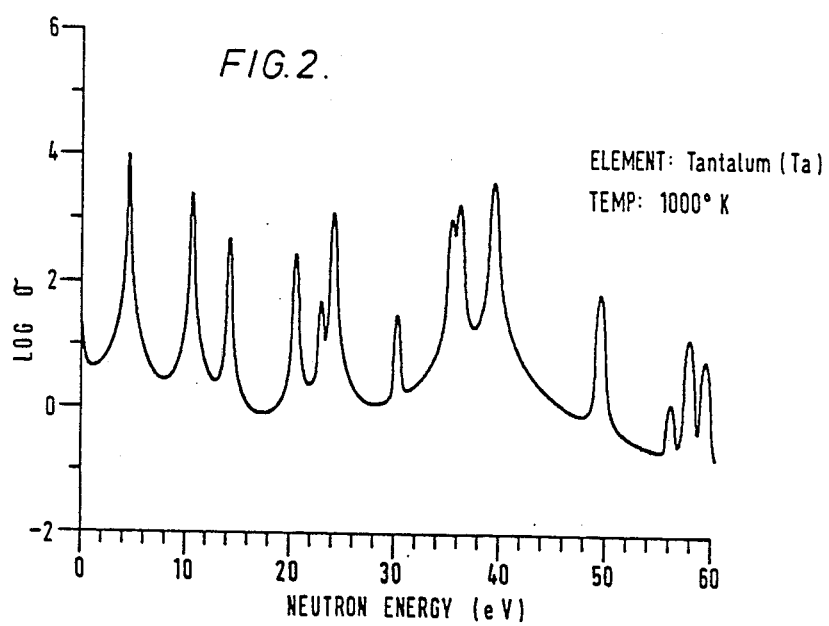

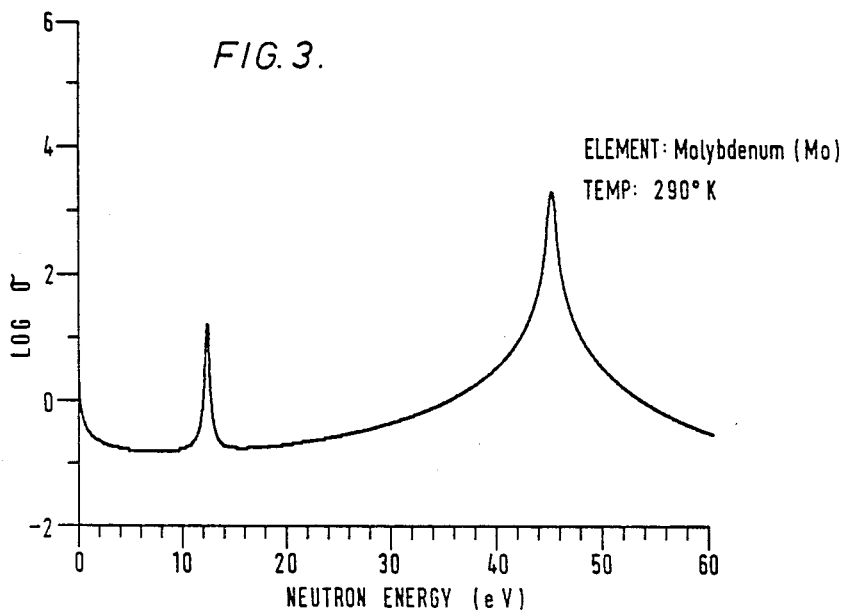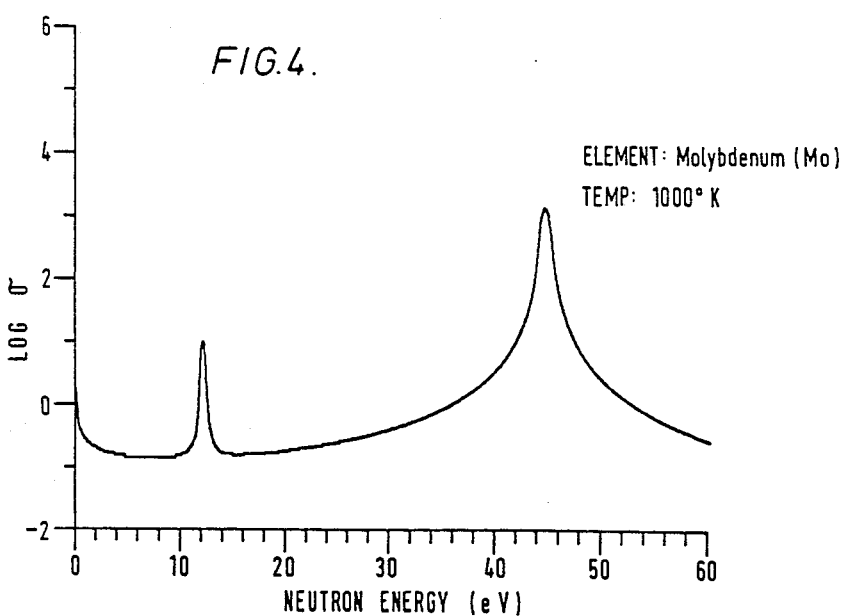

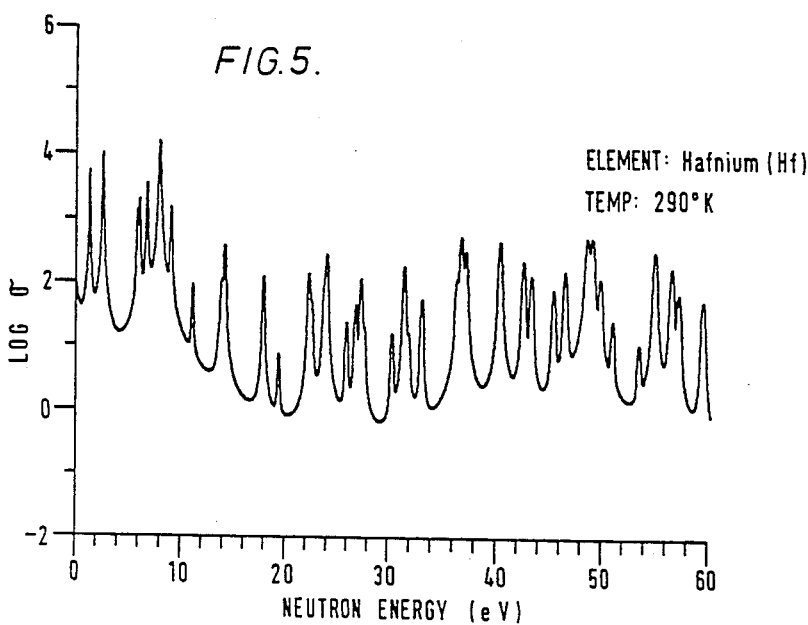
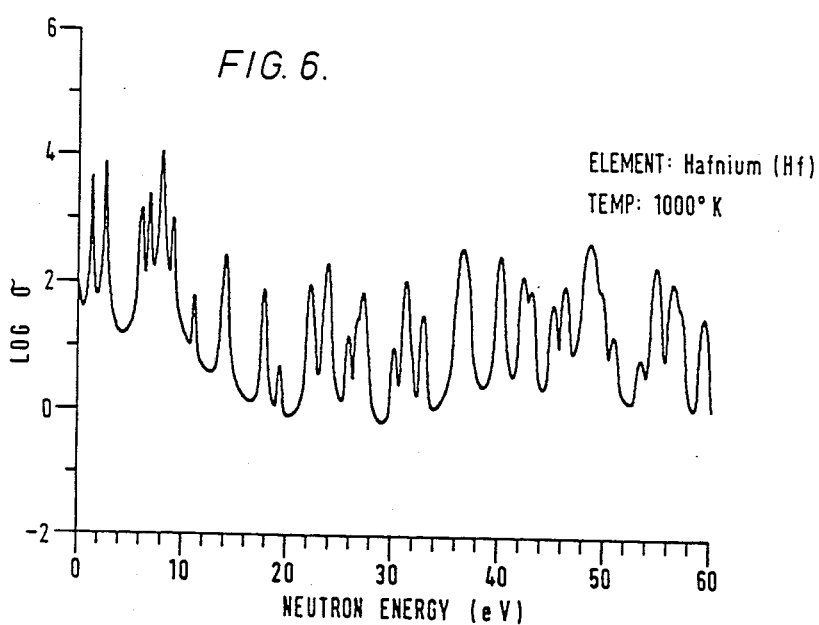

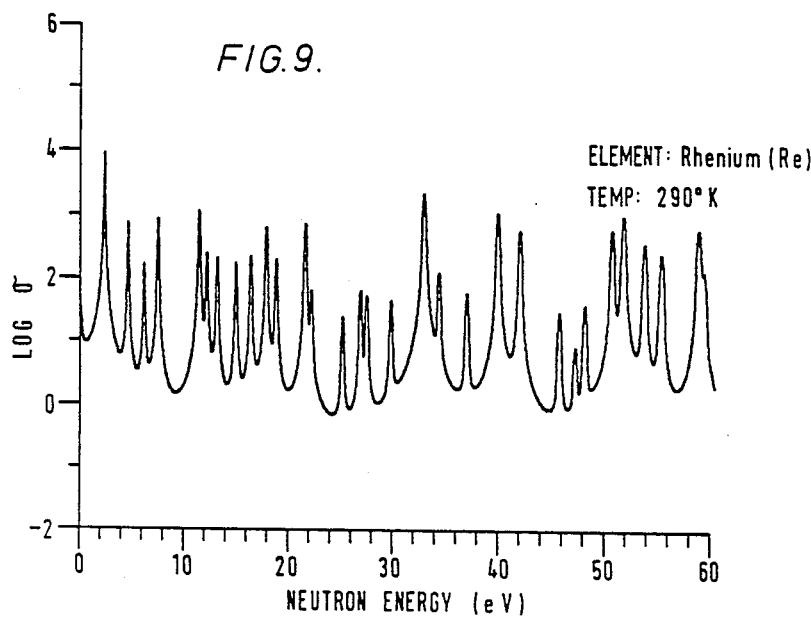
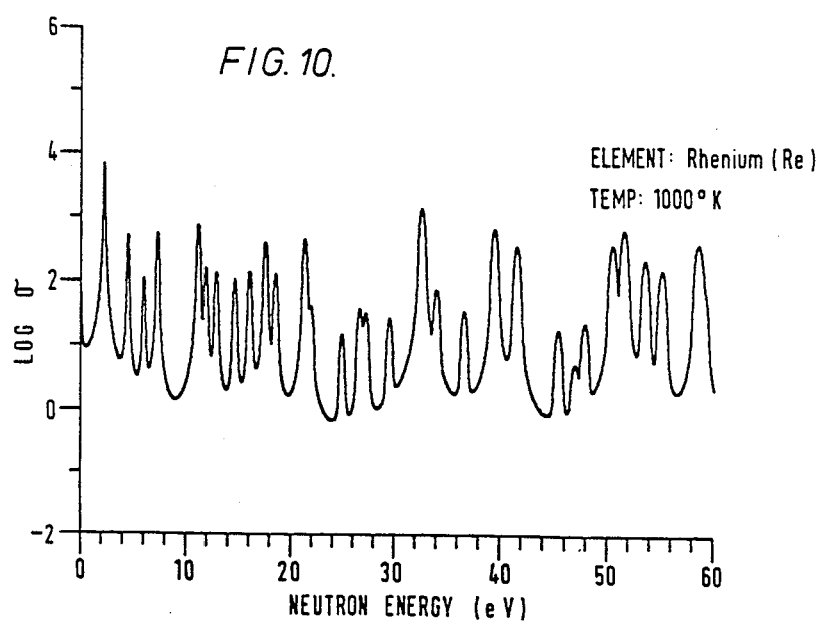

FIG. 11.
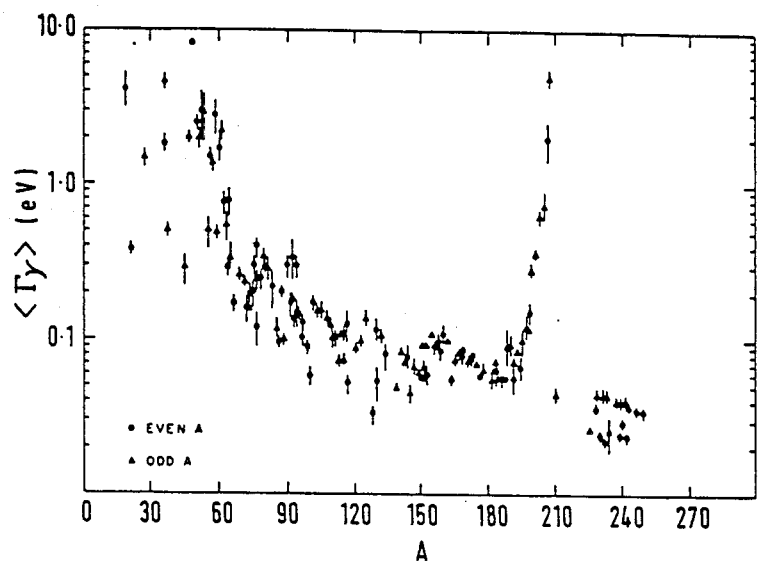
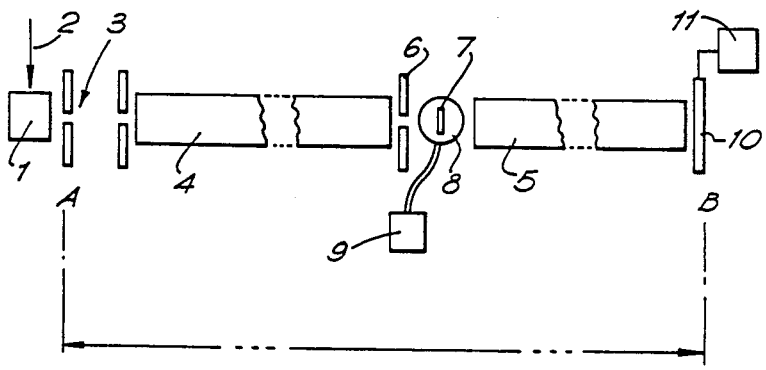
FIG.12.

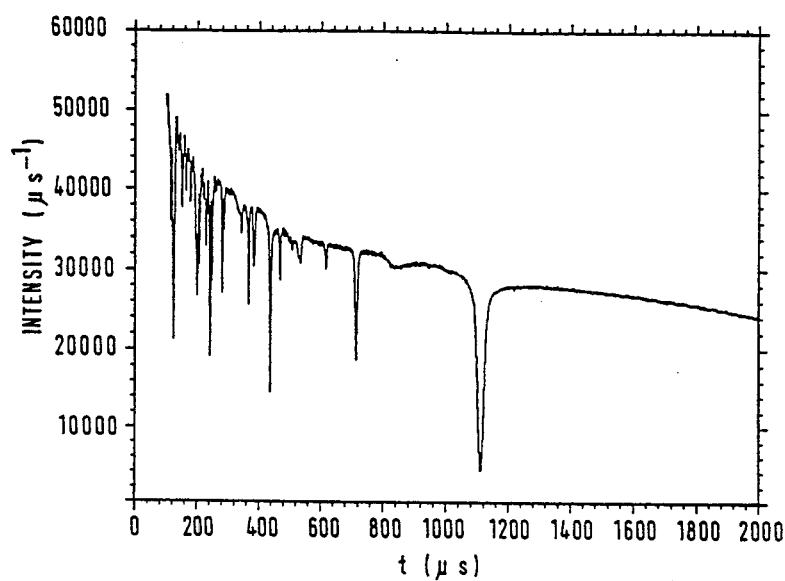
FIG. 13. Ta, Room Temperature (RT)
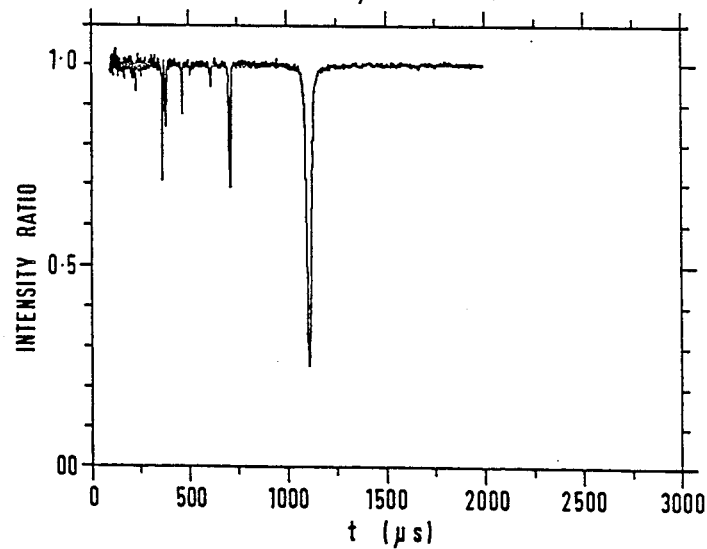
FIG. 14. Ta 27 μm T=475°C

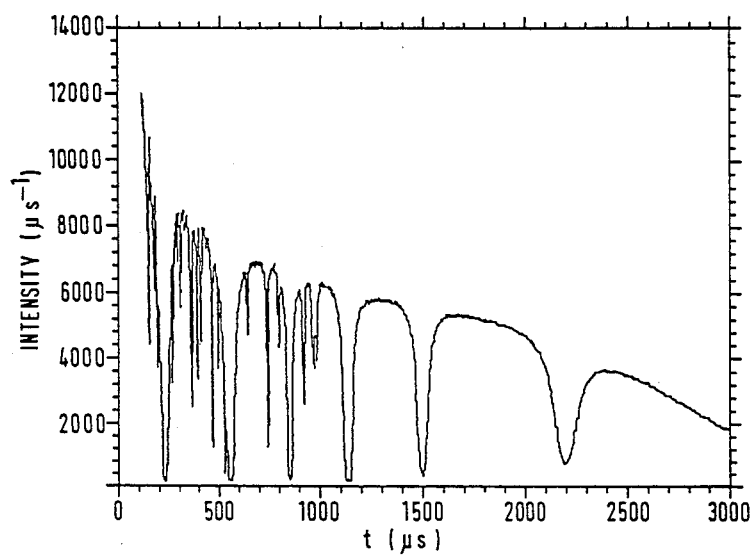
FIG. 15. RR 8 mm Room Temperature
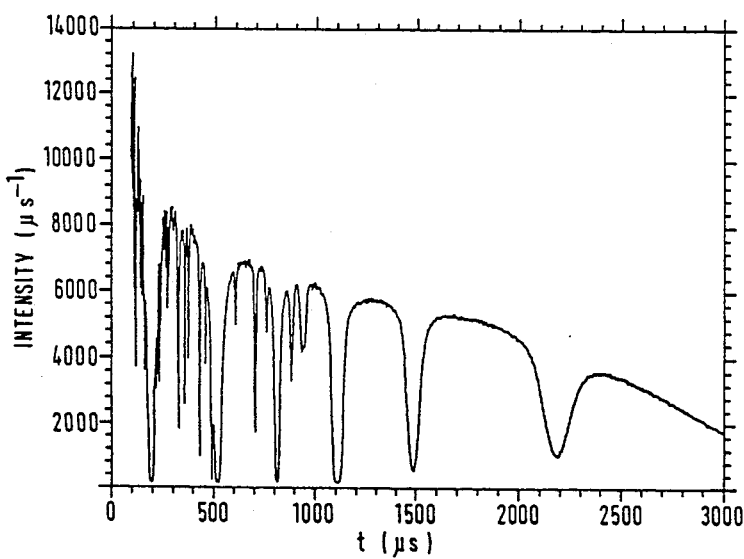
FIG. 16. RR 8 mm Temp = 730°C

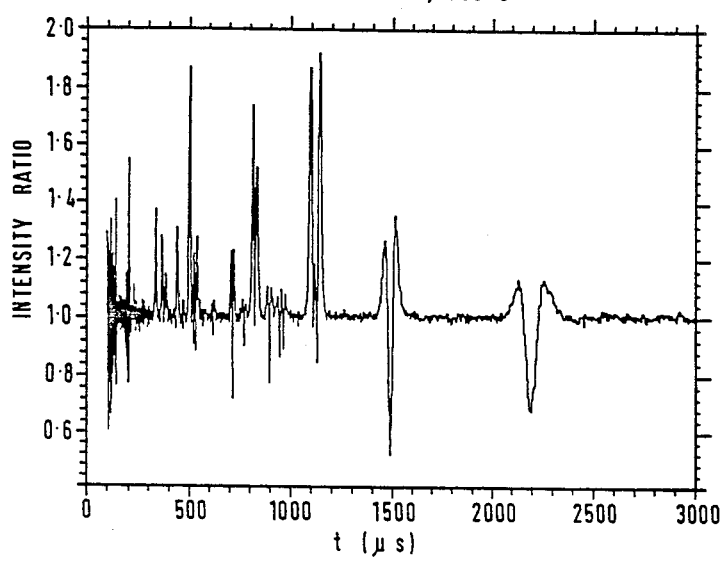
FIG. 17. RR 8mm RT/730°C
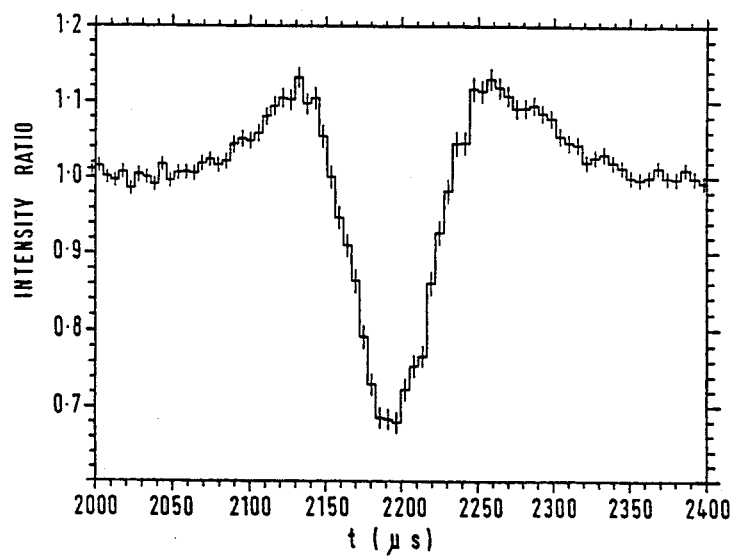
FIG. 18. RR 8mm RT/730°C

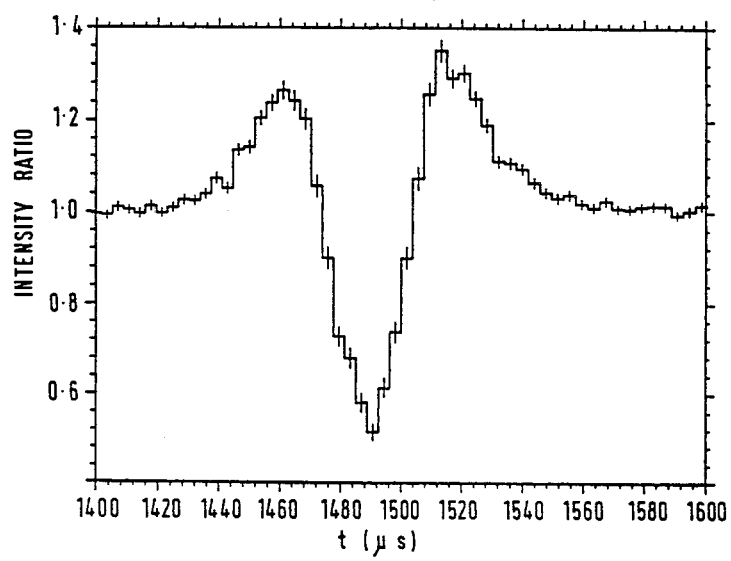
FIG. 19.  RR 8mm RT/730°C
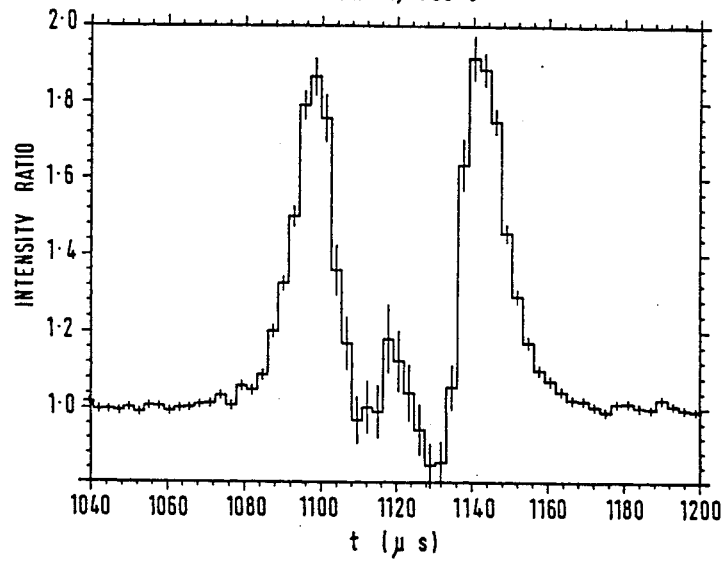
FIG. 20.  RR 8mm RT/730°C

TEMPERATURE MEASURING

This is a continuation of application Ser. No. 810,024, filed Dec. 17, 1985.

This invention relates to temperature measuring. In particular, it relates to measuring the temperature of a moving item, such as a turbine blade.

According to the present invention from one aspect, there is provided a method of measuring the temperature of an item, that comprises exposing the item to a beam of neutrons, monitoring the transmission characteristics of the item to neutrons and obtaining from the result of the monitoring an indication of the temperature of the item.

According to the present invention from another aspect, there is provided a system for measuring the temperature of an item, comprising:
  means for supplying a beam of neutrons to expose the item to the beam;
  means for monitoring the transmission characteristics of the item to neutrons; and
  means for obtaining from the result of the monitoring an indication of the temperature of the item.

Preferably, resonances in the transmission characteristics are monitored and there will now be described scientific background to the use of resonances.

BRIEF DESCRIPTION OF THE DRAWINGS

FIGS. 1–10 display for various chemical elements cross sections as a function of neutron energy at room temperature and 1000 K.

FIG. 11 display the various resonances for the chemical elements.

FIG. 12 is a schematic diagram of the system layout.

FIGS. 13 and 14 show a typical absorption spectrum and the effect of a comparison of two exposures with and without tantalum foil.

FIGS. 15–20 show typical absorption spectrums and the effect of various comparisons of two exposures with and without certain materials.

Figure 7:
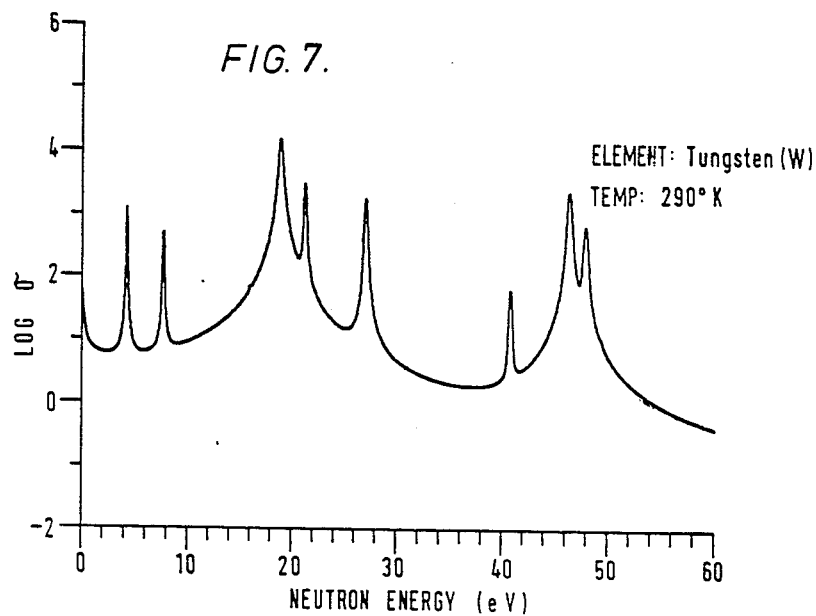
Figure 8:
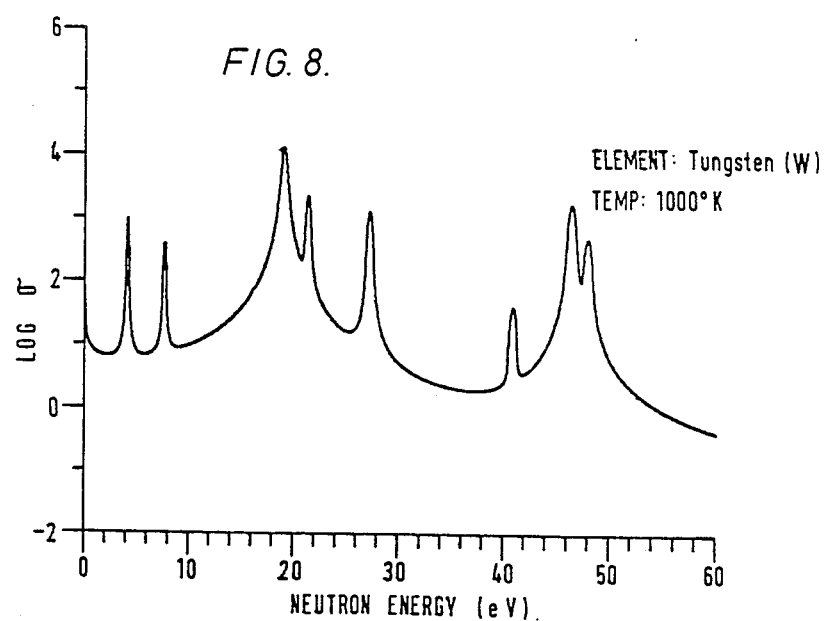

Isotopes of the heavier elements (having an atomic number $\geq 42$ molybdenum) often show sharp resonances in their ability to scatter or absorb neutrons. Close to these resonances, the cross-section for absorption can be very large, making for the ability to detect small quantities of the particular nuclide. The behaviour of the cross-section $\sigma$ with neutron energy E is given for an isolated resonance to a sufficient accuracy by:

$$\sigma = \sigma_o \left(\frac{E_o}{E}\right)^{\frac{1}{2}} \left[1 + 4\left(\frac{E - E_o}{\Gamma}\right)^2\right]^{-1} \quad (1)$$

where $\sigma_o$ is the value of the cross-section at resonance, when $E = E_o$ (the energy of the resonance), and $\Gamma$ is the resonance width.

Of particular importance to this invention is the 'sharpness of the resonance', given by the ratio of the resonance width $\Gamma$ to its energy $E_o$. The sharpest resonances are found in a more restricted set of nuclie—especially $70 \leq Z \leq 76$ and for thorium and uranium ($Z = 90$ and 92). Tantalum ($Ta_{73}^{181}$) has a very set of sharp resonances—its cross-section is shown as a function of neutron energy in FIGS. 1 and 2. Also shown (FIGS. 3–10) for both room temperature and 1000° K. are the cross-sections for some other relevant elements—molybdenum, hafnium, tungsten and rhenium. The number of resonances is rather high for hafnium and rhenium and is in part due to the fact that they both possess two isotopes with odd mass number A. The degree of excitation following neutron capture is higher in these cases of odd mass number, which is an important factor in determining the number of low energy resonances that they have. FIG. 11 shows the width $\Gamma_\gamma$ due to the emission of $\gamma$-rays following neutron capture, as a function of atomic weight of the nuclei. The full width $\Gamma$ equals $\Gamma_{65} + \Gamma_n$. The quantity $\Gamma_n$ varies widely from resonance to resonance but is usually less than $\Gamma_\gamma$. As can be seen $\Gamma_\gamma$ is low, $\sim 60$ meV, for nuclei with $A \sim 180$, that is elements Hf, Ta, W and Re. FIG. 11 displays the evidence that nuclides $150 \lesssim A \lesssim 195$ and $A > 210$ have the narrowest resonances and are therefore particularly suitable for the estimation of temperature. Fortunately, the isotopes of Hf, Ta, and W, which are components of many high temperature alloys, have masses in the range $176 \leq A \leq 186$ and thus narrow resonances which offer the best chance for accurate remote determination of temperature.

The temperature sensitivity of the resonance comes about due to Doppler broadening. In any material, the atoms and hence their nuclei are not at rest but are moving at an RMS speed V given by:

$$V = \left(\frac{3kT^x}{M}\right)^{\frac{1}{2}} \simeq 2.7 \left(\frac{T^x}{290A}\right)^{\frac{1}{2}} \text{ pm/sec} \quad (2)$$

where k is Boltzmann's constant, $T^x$ the effective absolute temperature and M the mass of the nucleus and A its atomic weight in atomic mass units. The relation between $T^x$ and T must be considered. At low temperatures there is a residual vibration of the atom that is characterized by the Debye temperature, $\theta_c$. It is readily shown that the relation between $T^x$ and T is expressible as:

$$T^x = \frac{3\theta_c}{8} \coth\left[\frac{3\theta_c}{8T}\right] \quad (3a)$$

At low temperatures $T^x \rightarrow \theta_c$ while at high temperatures, say, $T > \theta_c$ $$T^x \sim T + \frac{3\theta_c^2}{64T} \quad (3b)$$

The values of $\theta_c$ are listed in Table 1 below for a selection of elements. Thus, for temperatures equal to or above ambient, $T^x = T$ is an adequate simplification. For a minor constituent of an alloy, the situation is clearly different, but it is adequate to use the value of $\theta_c$ for the minor constituent element itself.

As a result of the motion of the target atom, the effective energy of the interaction is altered and becomes:

$$E_c = \mu/2[U^2 - 2UV\cos\theta + V^2] \quad (4)$$

where $\mu$ is the reduced mass, and is given by $$\mu = \frac{m_n M}{m_n + M} = \frac{A m_n}{A + 1}.$$

Also $U$ = the incident neutron velocity and $\theta$ the angle between the directions of motion of U and V. Thus E is spread out between:

$$\tfrac{1}{2}\mu(U-V)^2 \leq E_c \leq \tfrac{1}{2}\mu(U+V)^2 \quad (5)$$

where the limiting values of $\pm 1$ are used for Cos $\theta$. The effective value of this spread in energy when summed over the Maxwell distribution of thermal motion yields to a high accuracy a Gaussian distribution for the energy of the interaction:

$$B(E) \simeq \frac{1}{\sqrt{2\pi\Delta^2}} \exp{-\frac{(E - E_c)^2}{2\Delta^2}} \quad (6a)$$

where $\Delta$ is the RMS spread in the interaction energy and is given by:

$$\Delta \simeq \mu U[V\cos\theta]_{RMS} = \frac{A}{A+1}\left[\frac{0.05 E_n}{A}\left(\frac{T^x}{290°\ K.}\right)\right]^{\tfrac{1}{2}} eV \quad (6)$$

where $E_n$ is measured in eV and $T^x$ in °K. Note that $\Delta$ increases steadily with neutron energy $E_n$.

The effect of the thermal vibration is thus to broaden each resonance, and both its height and width are affected—the resultant shape being convolution of the raw line from equation 1 with the broadening function B given above. Thus the response at neutron energy $E_n$ due to the convolution is given by:

$$\sigma^1(E_n) = \int_0^{+\infty} J(E_n) B dE = \quad (7a)$$

$$\frac{\sigma_o}{\sqrt{2\pi\Delta^2}} \int_0^{+\infty} \left(\frac{E_o}{E}\right)^{\tfrac{1}{2}} \frac{\exp{-\frac{(E_n - E)^2}{2\Delta^2}}}{1 + 4\left(\frac{E_o - E}{\Gamma}\right)^2} dE$$

It is conventional to substitute
$x = (2/\Gamma)(E - E_o)$
$y = (2/\Gamma)[E_n - E_o]$
and $z = \Delta/\Gamma$
so that the expression can be written:

$$\sigma^1(E_n) = \sqrt{\frac{2}{\pi}} \cdot \frac{\sigma_o}{\Gamma\Delta} \int_0^{+\infty} \frac{\exp\left(-\frac{(y-x)^2}{8z^2}\right)}{1 + x^2} dx \quad (b)$$

This expression can be evaluated numerically. Variation of the value of y carries one across the resonance, and the range $-10 \leq y \leq 10$ is adequate. Different values for z express the ratio of the Doppler broadening to the natural width of the line.

There will now be described the results of experiments based on the above. A fully instrumented oven was prepared and set up in the beam line of a neutron source. FIG. 12 is a schematic diagram of the system layout. In FIG. 12, reference numeral 1 designates a target and moderator to produce neutrons as a result of bombardment by a beam of protons 2; reference numeral 3 designates a collimator for the neutron beam; 4 and 5 designate vacuum transport tubes; 6 designates aperture defining means through which the neutron beam passes to a specimen 7 in an oven 8 evacuated by a vacuum pump 9; and 10 designates a cylindrical He neutron detector (1 cm in diameter) coupled to signa processing electronic circuitry 11. Exposures to neutrons were taken both with and without a furnace and with and without a thin tantalum foil as a basis for comparison with the significant runs. The significant exposures were:

(a) A set of runs with a 27 $\mu$m tantalum foil at room temperature (RT), 230° C., 470° C., 630° C. and 730° C.

(b) A set of runs with 8 mm thick material supplied by Rolls Royce (RR) at room temperature, 465° C., 630° C. and 730° C., and (c) A short set of runs with a "thick" tantalum foil 106 $\mu$m at just 3 temperatures, room temperature, 465° C. and 630° C.

The results show dramatically the effect of the temperature on the neutron absorption, as will be shown below.

First, consider FIG. 13. This shows a typical absorption spectrum with a tantalum foil. The number of neutrons received per microsecond is plotted against the delay in the neutron arrival. The length of the beam line (i.e. the distance A-B in FIG. 12) used was 31.8 meters so that a delay of 1111 $\mu$sec implies a neutron energy of 4.28 eV. The large tantalum resonance there dominates the spectrum. There are many other features in the neutron distribution—a number of which are due to materials in the beam unassociated with our part of the experiment. Many of the chaotic jumble of resonances that had short times (and hence high neutron energies) are due to the cadmium in the beam close to the moderator. Cadmiim is utilized to remove thermal neutrons from the beam which would arrive too late and be associated with the wrong pulse.

FIG. 14 shows the effect of comparing two exposures, one with and one without the tantalum foil and plotting its transmission function. Only the tantalum shows up and background everywhere else is unity with 1% fluctuations.

Figure 21:
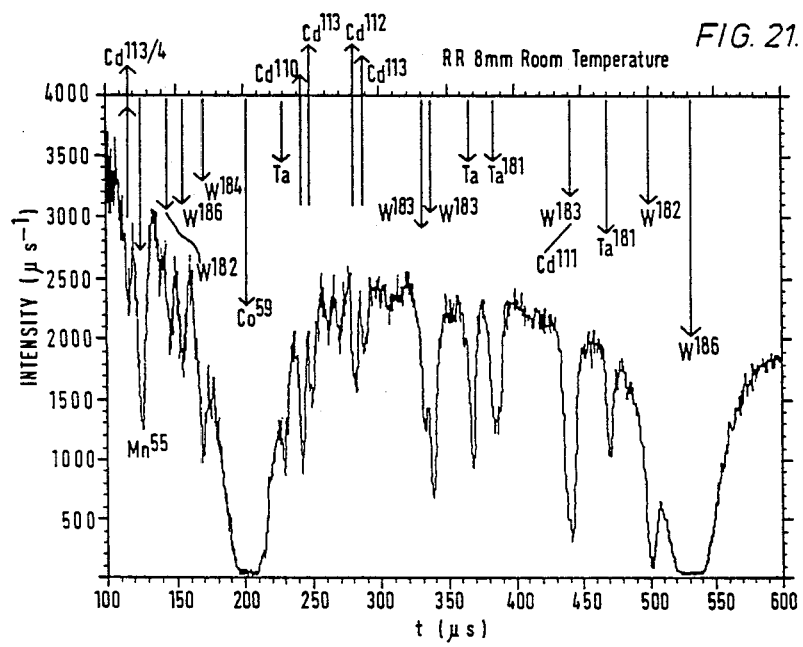
FIGS. 21 and 22 show enlarged versions of FIG. 15.

FIG. 15 shows the absorption with the 8 mm Rolls Royce material at room temperature. Many more deep resonances are immediately apparent that are due to the hafnium and tungsten present in addition to the tantalum. The data presented in FIG. 16 differs from FIG. 15 only in that the temperature of the Rolls Royce material was held at 730° C. Casual comparison of FIGS. 15 and 16 shows little differences. However, the differences are truly there, and can be vividly revealed by dividing the number of neutrons in each microsecond in the first neutron accumulation by those in the second. Clearly, if nothing had changed the result would be unity in all time slots, but what can be seen in this time interval is shown in FIG. 21. Each resonance is replaced by a crater-like shape which approximates in fact to the second derivative of the resonance curve.

FIGS. 18 and 19 show this data with the statistical errors in each time slot displayed. The effect of the temperature is considerable with the changes of up to a factor of two in the neutron count occurring due to temperature difference between exposures. The data from *each* pair of temperatures give a similar picture yielding an accuracy of temperature determinatin $\Delta T = 10°$ K. When all the resonances available $-10.5$ eV are used, then $\Delta T$ is reduced to $\pm 5°$ K.

FIG. 20 shows the 4 eV resonance and the effect of temperature. This resonance is a blend of two lines, one at 1111 μsec delay, due to tantalum, and the second at 1130 μsec due to tungsten, and this accounts for the different shape of the 'crater' like curves.

Figure 22:
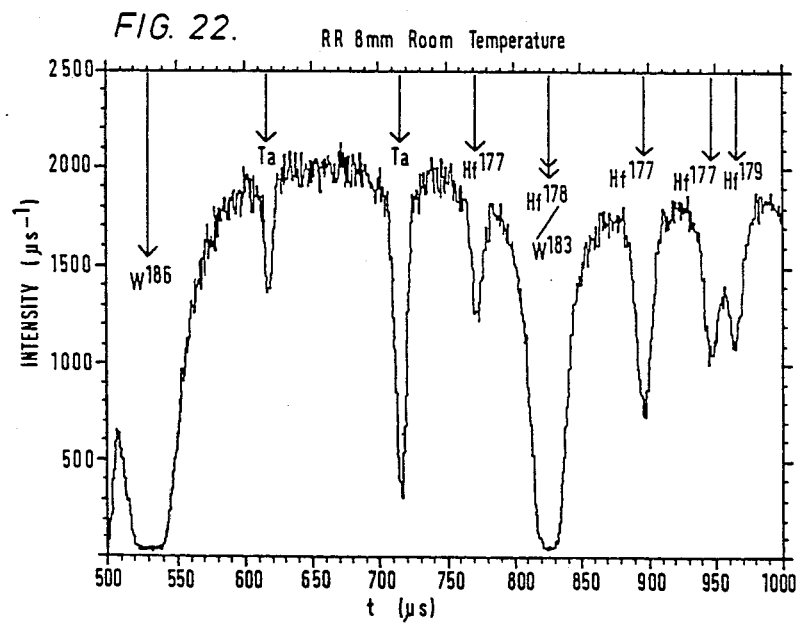

FIGS. 21 and 22 show enlarged versions of part of the raw data from FIG. 15. The various resonances are identified. Note the high $Co^{59}$ resonance at ~200 μsec delay, and that of $W^{186}$ at 530 μsec. $Mn^{55}$ was present also, it is believed, in the oven walls, (124 μsec). The cadmium was used to filter out low energy neutrons, but also left its mark in the epithermal range.

To summarise, in the above system, the phenomenon of thermal Doppler broadening of nuclear resonances is exploited at a remote and non-invasive temperature probe in neutron transmission radiography measurements. The system has the advantage that the broadening of each nuclear resonance line gives the temperature of the material containing that specific nucleus, and not of the other material in the neutron beam. Hence, for example, it may be used to probe the temperature of resonant nuclei in a device surrounded by several centimeters of steel. Further, the temperature of a moving component may be distinguished from a static component of the same composition because of the mechanical Doppler effect. Most elements with $Z \geq 42$ have suitable resonances. The resonances in Hf, Ta and W (common in high temperature alloys) are particularly suitable.

To obtain the temperature of a given item, the following procedure may be adopted.

For a given element in the item, a set of calibration curves is prepared, each curve being of the ratio of the neutron intensity at a reference temperature to the neutron intensity at a respective different, known temperature, around a resonance. The item itself, an an unknown temperature, is then used to produce, for the same element and the same resonance, a measurement curve of the ratio of the neutron intensity at the reference temperature to the neutron intensity at the unknown temperature.

Finding that one of the calibration curves with which the measurement curve fits best gives the unknown temperature to a determinable degree of accuracy.

TABLE 1

| | $\sigma_{scattering}$ (Barns) | Number of resonances 3–50eV | Mean free path cms | $\theta$Debye °K. |
|---|---|---|---|---|
| Al | 1.45 | — | 11.50 | 380 |
| Ti | 4.3 | — | 4.13 | 360 |
| Cr | 4.3 | — | 2.81 | 480 |
| Fe | 11.5 | — | 1.03 | 400 |
| Co | 9.0 | — | 1.22 | 380 |
| Ni | 17.5 | — | 0.63 | 390 |
| Cu | 7.6 | — | 1.55 | 310 |
| Nb | 6.4 | — | 2.82 | 250 |
| Mo | 5.5 | 1 | 2.85 | 380 |
| Hf | — | 28 | — | 210 |
| Ta | — | 11 | — | 230 |
| W | — | 8 | — | 315 |
| Re | — | 22 | — | 275 |

Notes
Resonances are included if $\sigma_{max} > 100$ barns. $\sigma_{scattering}$ and the mean free path are given where the value is essentially constant over most of the energy range.

Figure 23:
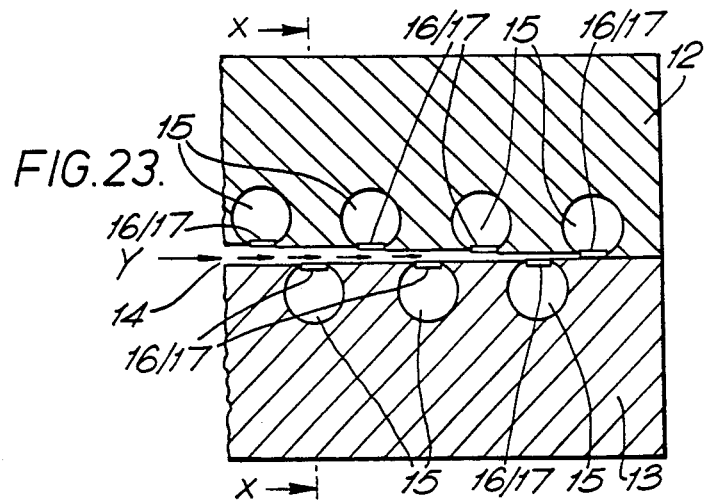
FIG. 23 is an alternative form of the neutron detector.
Figure 24:
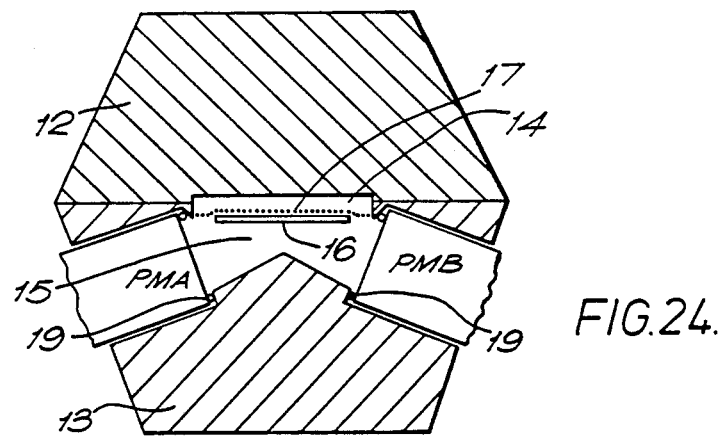
FIG. 24 is a section of X—X in FIG. 23.
Figure 25:
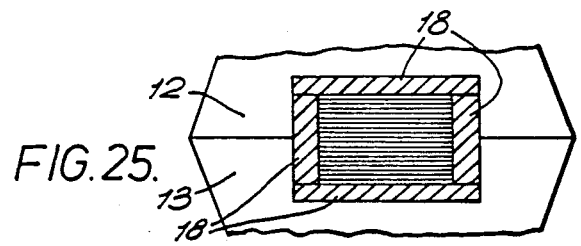
FIG. 25 is a front view of FIG. 23.

With reference to FIGS. 23, 24 and 25, there will now be described an alternative form of neutron detector usable in apparatus according to the invention. FIG. 23 is a longitudinal section of part of the detector; FIG. 24 is a section on X—X in FIG. 23; and FIG. 25 is a view of the front of the detector where neutrons enter. The detector comprises a pair of aluminium blocks 12 and 13 which are shaped to provide a passageway 14 between them which becomes progressively thinner in the direction of neutron travel. In the blocks 12 and 13, there are a total of twenty-five transverse cavities 15, twelve of them in one of the blocks and thirteen in the other and alternating with one another as shown in FIG. 23. Between each cavity 15 and the passageway 14 there is a rectangular LiI scintillator 16 faced with an aluminium foil 17. On the opposite sides of each cavity 15 there are respective photomultipliers PMA and PMB for the cavity. As shown in FIG. 25, the shape and size of the entrance opening to neutrons of passageway 14 is defined by adjustable members 18 of boron. Reference numerals 19 denote O-rings for the photomultipliers. Typically, each scintillator 16 could be about 50 mm×10 mm×1 mm in dimensions.

Figure 26:
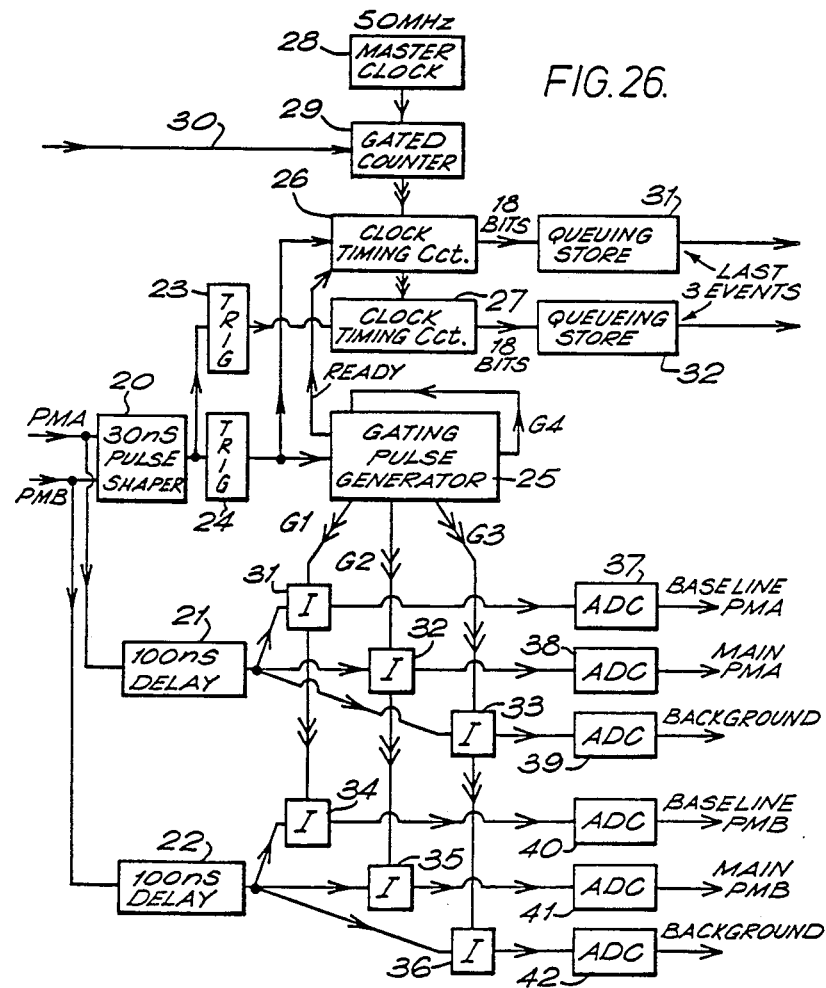
FIG. 26 is a block diagram of electronic signal processing circuitry for the detector in FIG. 23.
Figure 27:
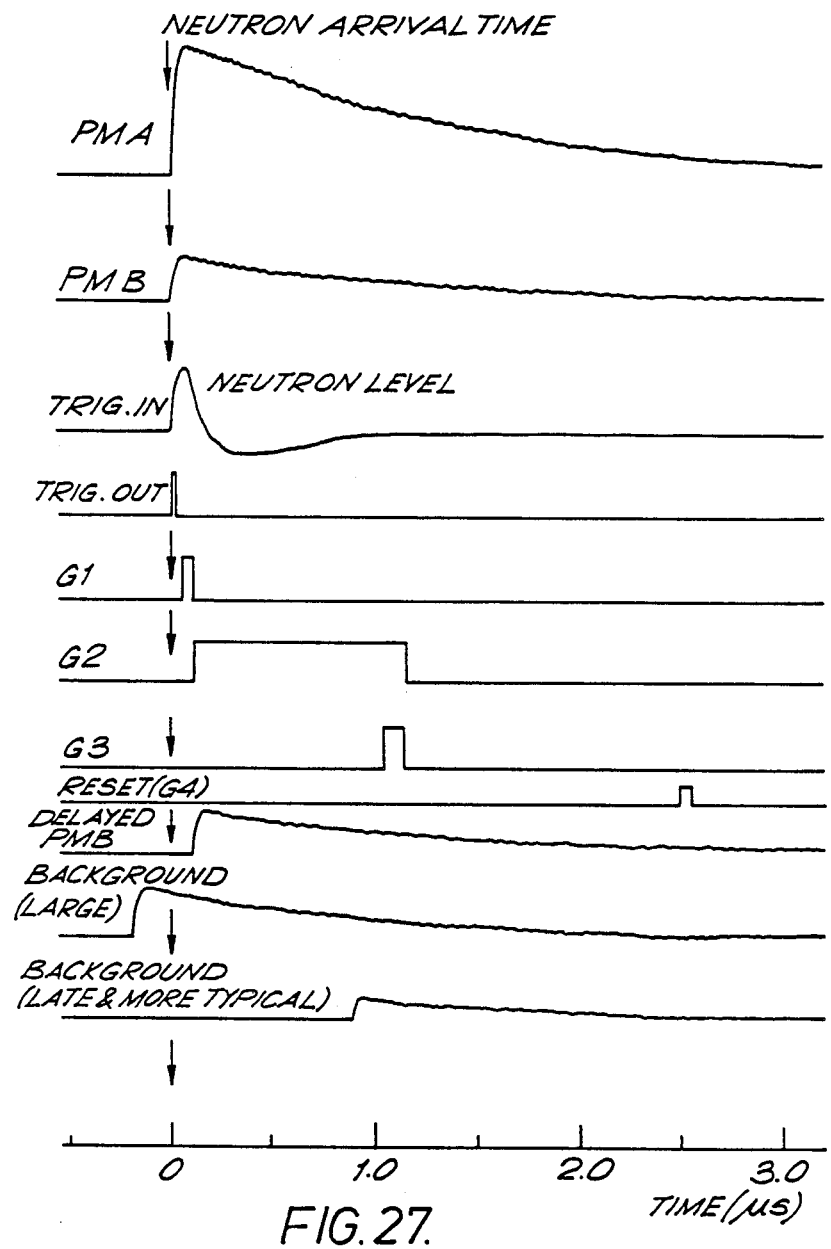
FIG. 27 is some typical timing pulses and waveforms for FIG. 26.

FIG. 26 is a block diagram of electronic signal processing circuitry that may be used in conjunction with the detector of FIGS. 23, 24 and 25, for measuring neutron arrival time, which is dependent on neutron energy. The circuitry of FIG. 26 is for a respective pair of photomultipliers PMA and PMB, each pair having respective such circuitry. The outputs of the photmultipliers PMA and PMB are applied to a 30 ns pulse shaper 20 (which adds the two outputs together) and also to respective ones of a pair of 100 ns delay circuits 21 and 22. The output of pulse shaper 20 is applied to a pair of trigger circuits 23 and 24, the former being set to trigger at about 0.3 Mev detected particle energy (for responding to the presence of a γ-ray) and the latter being set to trigger at about 3.5 Mev detected particle energy (for responding to the presence of a neutron). The output of trigger circuit 24 is applied to a gate pulse generator 25 and a clock timing circuit 26. The output of trigger circuit 23 is applied to a second clock timing circuit 27. A 50 MHz master clock 28 drives a counter 29 which is gated by pulses on line 30 synchronous with timing pulses for the neutron source, the counter 29 controlling the timing signals for the timing circuits 26 and 27. The outputs of the clocks 26 and 27 are applied to respective queuing stores 31 and 32 whose outputs are the neutron and γ-ray arrival times respectively. The generator 25 produces gating pulses G1, G2, G3 and G4 and a "ready" pulse (applied to clock 26). The output of delay circuit 21 is applied to gated integrators 31, 32 and 33; the output of delay circuit 22 is applied to gated integrators 34, 35 and 36; and the output of integrators 31 to 36 are applied to analogue to digital converters 37 to 42 respectively. Some typical timing pulses and waveforms are shown in FIG. 27.

To demand coincidence between the outputs of photomultipliers PMA and PMB would not be particularly helpful as all signal and background processes will make pulses in both. Each photomultiplier is likely to have between 5% and 95% of the output, so triggering is best achieved ob their sum, which is applied to both trigger circuit 24 (which is set to select the neutrons) and trigger circuit 23 (which is set at a considerably lower level corresponding to 0.3 Mev to detect the γ-ray background).

The logic pulse following detection of a neutron pulse by trigger circuit 24 sets off the generation of gating pulses G1, G2 and G3 and reset pulse G4. The main pulse is G2 whose length corresponds approximately to the duration of the scintillation. Pulses G1 and G3 are used to monitor the period just before and at the end of the scintillation of the neutron, and thus give a measure of contribution of any background from either another neutron or γ-rays. The reset pulse enables the gate pulse generator to accept a further neutron—and may need an additional delay of perhaps 1 μsec after the end of G2 to cope with the analogue to digital converters etc. The generator 25 should also enable the neutron timing circuit to provide a flag to accompany the time of any neutron that gives a trigger. The integrators 31 to 36 are gated by pulse G1, G2 and G3 and accept delayed versions of the photomultiplier pulses. The main pulse needs, say, 10 bits; the others, that will be used as corrections, could well be limited to 8 bits. The actual output time for the neutron is needed to an accuracy of 0.2 μsec, but the background corrections need the relative time of the neutron to be detected and possible contaminant neutron or γ-ray(s) with more precision. Thus a master clock running at 50 MHz is used.

The period between the neutron source timing pulse and the slowest neutron of interest is ~2000 μsec. This is $10^5$ cycles of the master clock—so 18 bits are required. To cover for the arrival of say 3 neutrons in the period of analysis of the first, it is necessary to know the time of each, even if they cannot be measured. Hence queuing store 32 is used. Clearly, one needs to know the time of any neutron preceding the one that is being analysed as it can be responsible for the signals detected in integrators 31 and 34. Times of later neutrons could perhaps be represented by incremental times to save bits.

For the γ-ray background pulses the system is very similar. For use as a correction, only a maximum of two pulses can probably be coped with, but it might be safer to allow for say 1 more. Although only incremental times with respect to the neutron trigger are needed, again one is interested in γ-rays somewhat earlier as well as after the neutron pulse.

The outputs of the two queuing stores contain 108 bits for each neutron. The maximum incremental time say 4 μsec ending in the reset pulse—which is only 200 master clock pulses—i.e. 8 bits. Therefore one could reduce the bit requirement to $18+5\times 8=58$.

The twenty-five scintillators are all viewed independently. Apart from cosmic ray background, no coincidences of note are to be expected from the beam γ-rays. The whole device is thus run as twenty-five independent units, each producing up to 164 bits per neutron.

The neutron rate in the pulse up to which one can operate is $4\times 10^5$ neutrons/sec in each detector. So for each neutron source timing pulse $4\times 10^5\times (2\times 10^3$ μsec)=800 neutrons/detector would be acceptable or $2\times 10^4$/pulse for the whole device. For 50 neutron pulses per second, the full number of neutrons counted would be ~$10^6$/sec. This yields a total of $1.6\times 10^8$ bits/second. A useful exposure at this rate would be obtained in ≦1000 seconds.

For testing out and understanding the behaviour of a single element, the date rate and the total *amount* of data that would be necessary for some temperature assignment could be handled using buffers and a video recorder. The full device however produces a high mean data rate together with a greater total amount of data for full exposure, involving the detection of around $10^8-10^9$ neutrons. Therefore, on line analysis would be appropriate.

The data could be stored in a two dimensional array, with one component being the position and the second the neutron energy. The position is given both by the particular scintillator that gives the trigger and and by the partition of light between the two photomultipliers that are involved, and the total positional information could perhaps be contained in 2000 elements. This allows up to 80 pixels for each detector element—which is all that is worthwhile if the number of photoelectrons detected for each neutron pulse is ~$10^4$. The neutron energy is given by the time and needs allowance for the different distances of the separate scintillators from the neutron source. Again this could be contained in 2000 linear elements without too much degradation of energy resolution at the highest energies. So, in total, for the useful exposure (~$10^9$ neutrons) there would be ~250 neutrons per time slot. For temperature analysis, I envisage groups of up to 100 of these positional pixels being combined together to yield a temperature—and the grouping would of necessity depend upon the target, its attenuation to neutrons and the attenuation gradient with position. Thus, the aim is to have in the region of 20 independent and worthwhile temperature assignments in the field of view—each of which would cover the whole neutron energy span $1<E<100$ eV and will in general contain a number of useful resonances in some cases from different resonating materials.

To achieve this, the effects of the background γ-rays, or overlapping neutron pulses, must be removed or reduced, otherwise the position of the neutron is wrongly assigned. For a given energy and timing of the background pulse, the effect on a particular photomultiplier signal depends strongly on the duration of the scintillation and the size of the photomultiplier pulse itself. Naturally, the smaller of the two is more vulnerable, but fortunately the smallest signals that will be accepted correspond to the edge of the field of view. Near the centre of the field of view, the ratio will usually be ≦3:1. The corrections to be applied therefore must be adjustable—and probably tailored to the individual scintillators. The corrections will depend on the times of the disturbing pulses which are obtainable from the queuing store outputs, and the magnitudes of the signals produced from the gated integrators 31,33,34 and 36. If the computed correction exceeds some threshold, the neutron will have to be rejected.

When the target is stationary, data from all the neutrons detected for each pixel will be stored together. However, for a rotating target one must allow for its motion across the field of pixels during the sensitive time so that data from the neutrons that penetrated each given part of the target are stored together. This can be done readily if one knows the angular velocity and axis of rotation of the target for each pulse of neutrons from the source.

Analysis of the data from a rotating target will also involve allowance for the effects of any component velocity along the direction of the neutron beam. This will shift the resonance position by amounts that can be taken from the data, or from the knowledge one should have on the direction and speed of rotation and its axis with respect to the beam position and direction.

Figure 28:
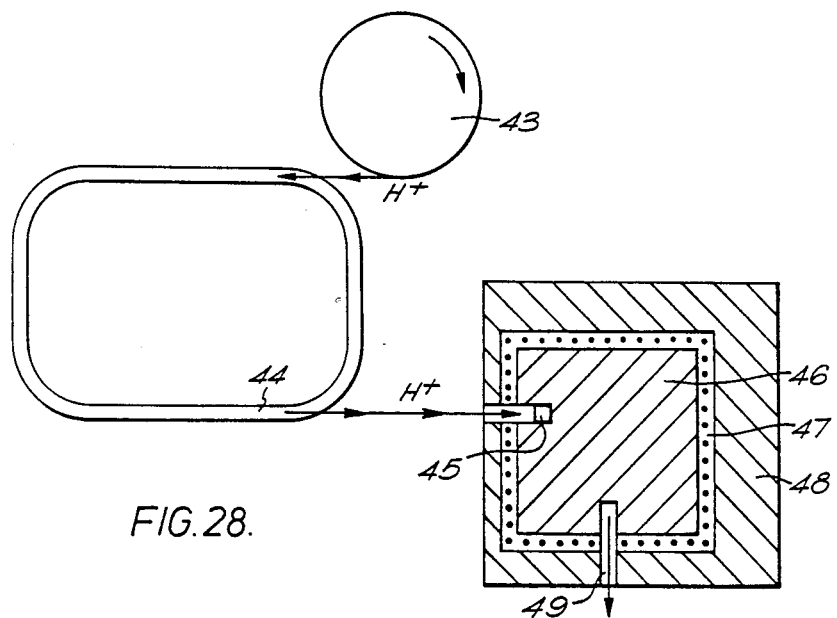
FIG. 28 is a schematic diagram of a possible form of neutron source.

FIG. 28 is a schematic diagram of a possible form of neutron source. A superconducting cyclotron accelerator 43 of about 0.5 m in diameter produces H+ ions which are storable ihn a storage ring 44 (whose dimensions are about 1.0×0.7 m) in which they are constrained electromagnetically. H+ ions from the ring 44 are applied to a liquid lithium target 45 in a moderator 46 which is a material very rich in hydrogen and about 10 cm across. Surrounding the moderator 46 is a reflector 47 of natural nickel (or $Ni^{58}$) and around the reflector 47 is a blanket 48 of $U^{238}$. Neutrons exit from an outlet 49. Alternatively, the target 45 could be beryllium (or uranium if high energy beams are used—say $\geq 40$ Mev). The moderator material could be dense polyethylene, or a solid unbranched paraffin, or even $N_2H_4.H_2O$. Instead of a storage ring as shown, storage could be achieved in an arrangement in the outer regions of the accelerator itself.

I claim:

1. A system for measuring the temperature of a portion of a rotating item comprising:
  means for supplying a beam of neutrons to expose said portion of the beam;
  neutron detection means for detecting non-scattered neutrons which have passed through said portion;
  counting means for counting neutrons detected by said detection means, said counting means including control means such that said counting means counts non-scattered neutrons at different energies which have passed through said portion, and said control means produces a signal related to a neutron-energy dependent neutron transmission spectrum for the said portion;
  means for compensating for movement of said item due to rotation of said item; and
  means responsive to said signal for utilizing at least a part thereof due to a resonance in said transmission spectrum resulting from a chemical element included in said portion to produce a representation of the temperature of said portion.

2. A system according to claim 1, wherein said counting means includes means for counting neutrons arriving at the detection means at different times so as to count neutrons at different energies.

3. A system according to claim 1, wherein said signal represents, at each of said energies, the ratio of counted neutrons which have passed through said poriton when the latter is at a reference temperature with counted neutrons which have passed through said portion when said portion is at the temperature to be measured, and wherein said responsive means comprises means for comparing values of said signal at said resonance with corresponding values of different signals, each of said signals representing the ratio, at each of said energies, of counted neutrons which have passed through a sample including said chemical element at the said reference temperature with counted neutrons which have passed through the sample at a known temperature.

4. A system according to claim 1, wherein said detection means detects non-scattered neutrons which have passed through a plurality of said portions, said counting means counting detected neutrons which have passed through each of said portions, said control means producing a signal corresponding to each of said portions and said responsive means utilizing at least a part of each signal to produce a representation of the temperature of each of said portions.

5. A system for measuring the temperature of each of a plurality of portions of an item comprising:
  (a) means for supplying a beam of neutrons to expose each of said portions to the beam;
  (b) neutron detection means for detecting non-scattered neutrons which have passed through said portions;
  (c) counting means for counting detected neutrons which have passed through each of said portions, said counting means including control means for counting said non-scattered neutrons at different energies, said control means producing a signal related to a neutron-energy dependent neutron transmission spectrum for each of said portions; and
  (d) means responsive to each of said signals for utilizing at least a part of said signal due to a resonance in the transmission spectrum resulting from a chemical element included in said portion for indicating the temperature of each of said portions.

6. A system according to claim 5, wherein said counting means counts neutrons arriving at the detection means at different times so as to count neutrons at different energies.

7. A system according to claim 5, wherein said signal represents, at each of the said energies, the ratio of counted neutrons which have passed through one of said portions when said portion is at a reference temperature, with counted neutrons which have passed said portion when said portion is at the temperature to be measured, and wherein said responsive means includes means for comparing said signal with corresponding different signals, each of said signals representing a ratio, at each of said energies, of counted neutrons which have passed through a sample including said chemical element at said reference temperature with counted neutrons which have passed through the sample at a known temperature.

8. A method of measuring the temperature of a portion of a rotating item comprising the steps of:
  (a) supplying a beam of neutrons to expose said portion to the beam;
  (b) detecting non-scattered neutrons which have passed through said portion;
  (c) counting detected neutrons, counting only non-scattered neutrons at different energies which have passed through said portion, and producing an indicating signal related to a neutron-energy dependent neutron transmission spectrum for said portion;
  (d) compensating for movement due to rotation of said item; and
  (e) utilizing at least a part of said indicating signal due to a resonance in said transmission spectrum resulting from a chemical element included in said portion to produce a representation of the temperature of said portion.

9. The method according to claim 8, further including the steps of controlling counting so that neutrons arriving at different times are counted, so as to count neutrons at different energies.

10. The method according to claim 8, wherein producing said indicating signal includes, at each of said energies, the steps of forming a ratio of counted neutrons which have passed through said portion when said portion is at a reference temperature with counted neutrons which have passed through said portion when said portion is at the temperature to be measured, and further including comparing values of said indicating signal at said resonance with corresponding values of different indicating signals, each representing a ratio, at each of said energies, of counted neutrons which have passed through a sample including said chemical element at said reference temperature with counted neutrons which have passed through the sample at a known temperature.

11. A method according to claim 8, further including the steps of detecting said non-scattered neutrons which have passed through a plurality of said portions, counting the detected neutrons which have passed through each of said portions respectively, producing an indicating signal for each of said portions and utilizing at least a part of each signal to produce a representation of the temperature of each of said portions.

12. A method of measuring the temperature of each of a plurality of portions of an item comprising the steps of:

supplying a beam of neutrons to expose each of said portions to the beam;

detecting non-scattered neutrons which have passed through each of said portions;

counting detected neutrons which have passed through each of said portions, controlling said counting so that non-scattered neutrons at different energies which have passed through said portions are counted, and producing an indicating signal of a neutron-energy dependent neutron transmission spectrum for ech of said portions; and utilizing at least a part of each of said indicating signals due to a resonance in the transmission spectrum resulting from a chemical element included in each of said portions and producing a representation of the temperature of each of said portions.

13. A method according to claim 12, further including the step of controlling said counting to count neutrons arriving at different times so as to count neutrons at different energies.

14. A method according to claim 12, wherein each of said indicating signals represents, at each of said energies, the ratio of counted neutrons which have passed through a portion when said portion is at a reference temperature with counted neutrons which have passed through said portion when said portion is at the temperature to be measured, the method further comprising comparing values of each of said indicating signals at the resonance with corresponding values of different indicating signals, each of which represents the ratio, at each of said energies, of counted neutrons which have passed through a sample including said chemical element at said reference temperature with counted neutrons which have passed through the sample at a known temperature.

* * * * *

UNITED STATES PATENT AND TRADEMARK OFFICE
CERTIFICATE OF CORRECTION

Page 1 of 2

PATENT NO. : 4,839,519
DATED : June 13, 1989
INVENTOR(S) : Peter Howard Fowler

It is certified that error appears in the above-identified patent and that said Letters Patent is hereby corrected as shown below:

In the Specification:

Column 1, line 11, delete "," after "item".

Column 1, line 33, "1000 K" should be --1000° K--.

Column 1, line 34, "display" should be --displays--.

Column 1, line 36, add "experimental" after "the".

Column 1, line 47, delete entire sentence and add --Fig. 24 is a sectional view of the neutron detector of Fig. 23 taken along section line X-X.--

Column 1, lines 51-52, delete entire sentence and add --Fig. 27 is a timing diagram which illustrates typical timing pulses and wave forms which are generated in the processing circuitry of Fig. 26--.

Column 2, line 9, insert "useful" after "very".

Column 2, line 24, "T65" should be --TV--.

Column 3, line 17, "$\tfrac{1}{2}\mu(U=V)^2 \leq E_c \leq \tfrac{1}{2}\mu(U+V)^2$" should be --$\tfrac{1}{2}\mu(U-V)^2 \leq E_c \leq \tfrac{1}{2}\mu(U+V)^2$--.

Column 4, line 45, "Cadmiim" should be --Cadmium--.

Column 5, line 8, "-10.5" should be --<10.5--.

UNITED STATES PATENT AND TRADEMARK OFFICE
CERTIFICATE OF CORRECTION

PATENT NO. : 4,839,519

DATED : June 13, 1989

INVENTOR(S) : Peter Howard Fowler

Page 2 of 2

It is certified that error appears in the above-identified patent and that said Letters Patent is hereby corrected as shown below:

Column 6, lines 39-40, "photmultipliers" should be --photomultipliers--.

Column 8, line 2, "$\leqq 1000$" should be --$\leq 1000$--.

Column 8, line 52, "$\leqq 3:1.$" should be --$\leq 3:1.$--

Column 9, line 11, "ihn" should in --in--.

Column 9, line 22, "polyetylene" should be --polyethylene--.

Signed and Sealed this

Eighth Day of May, 1990

Attest:

HARRY F. MANBECK, JR.

Attesting Officer

Commissioner of Patents and Trademarks